(12) United States Patent
Courtiade et al.

(10) Patent No.: US 11,409,914 B2
(45) Date of Patent: Aug. 9, 2022

(54) METHOD OF MANAGING A TAMPER-PROOF DEVICE COMPRISING SEVERAL SOFTWARE CONTAINERS

(71) Applicant: THALES DIS FRANCE SAS, Meudon (FR)

(72) Inventors: Fabien Courtiade, Gemenos (FR); Florent Labourie, Gemenos (FR); Denis Dubois, Gemenos (FR); Syarif Ahmad, Gemenos (FR); Jianrong Yang, Gemenos (FR); Nopiga Pahala, Gemenos (FR); Shier Loon Sharon Yong, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 16/765,199

(22) PCT Filed: Nov. 6, 2018

(86) PCT No.: PCT/EP2018/080329
§ 371 (c)(1),
(2) Date: May 19, 2020

(87) PCT Pub. No.: WO2019/101508
PCT Pub. Date: May 31, 2019

(65) Prior Publication Data
US 2020/0279059 A1    Sep. 3, 2020

(30) Foreign Application Priority Data

Nov. 21, 2017  (EP) ..................................... 17306605
Feb. 21, 2018  (EP) ..................................... 18305181

(51) Int. Cl.
*G06F 7/04* (2006.01)
*G06F 15/16* (2006.01)
(Continued)

(52) U.S. Cl.
CPC .............. *G06F 21/71* (2013.01); *G06F 21/77* (2013.01); *H04L 63/0263* (2013.01);
(Continued)

(58) Field of Classification Search
CPC ........ G06F 21/71; G06F 21/77; H04W 12/35; H04W 12/50; H04W 12/086; H04W 4/60;
(Continued)

(56) References Cited

U.S. PATENT DOCUMENTS

| 9,531,831 | B1* | 12/2016 | Cuadrat | H04W 8/183 |
| 2008/0163352 | A1* | 7/2008 | Boudou | H04L 69/329 726/9 |
| 2013/0060959 | A1* | 3/2013 | Taveau | H04L 63/04 709/232 |
| 2016/0006762 | A1 | 1/2016 | Dumoulin et al. | |

(Continued)

FOREIGN PATENT DOCUMENTS

WO    2008123827 A1    10/2008

OTHER PUBLICATIONS

"Global Platform Card Specification," Version 2.2.1, http://www.globalplatform.org, 303 pages, (Jan. 1, 2011).

(Continued)

*Primary Examiner* — Amie C. Lin
(74) *Attorney, Agent, or Firm* — Marc Boillot—Thales Dis CPL USA, Inc

(57) ABSTRACT

The invention is a method for managing a tamper-proof device comprising a plurality of software containers and an operating system. The operating system is able to handle a set of communication protocols with external entities. The operating system accesses a pairing data in which each communication protocol of said set has been associated with a single software container and upon receipt of a message from one of the external entities, the operating system uses the pairing data to route the message to the software container associated with the communication protocol used to convey the message.

16 Claims, 2 Drawing Sheets

(51) Int. Cl.
    *G06F 17/30*     (2006.01)
    *H04L 29/06*     (2006.01)
    *G06F 21/71*     (2013.01)
    *H04W 4/60*     (2018.01)
    *H04L 9/40*     (2022.01)
    *G06F 21/77*     (2013.01)
    *H04W 12/30*     (2021.01)
    *H04W 12/50*     (2021.01)
    *H04W 12/086*     (2021.01)

(52) U.S. Cl.
    CPC .............. *H04L 63/166* (2013.01); *H04W 4/60* (2018.02); *H04W 12/086* (2021.01); *H04W 12/35* (2021.01); *H04W 12/50* (2021.01)

(58) Field of Classification Search
    CPC ..... H04W 12/45; H04W 12/04; H04W 12/08; H04L 63/0263; H04L 63/166; H04L 63/16
    See application file for complete search history.

(56) References Cited

U.S. PATENT DOCUMENTS

2017/0142159 A1    5/2017   Li et al.
2017/0295158 A1   10/2017   Chastain
2018/0249322 A1*   8/2018   Kim ...................... H04W 8/183

OTHER PUBLICATIONS

International Search Report and Written Opinion issued in International Patent Application No. PCT/EP2018/080318, 11 pages (dated Dec. 13, 2018).
International Search Report and Written Opinion issued in corresponding International Patent Application No. PCT/EP2018/080329, 11 pages (dated Dec. 13, 2018).
"ISO/IEC 7816-3 Identification cards—Integrated circuit cards—Part 3: Cards with contacts—Electrical interface and transmission protocols," http://read.pudn.com/downloads132/doc/comm/563504/ISO-IEC%207816/ISO+IEC%207816-3-2006.pdf, 58 pages (Nov. 1, 2006).

* cited by examiner

METHOD OF MANAGING A TAMPER-PROOF DEVICE COMPRISING SEVERAL SOFTWARE CONTAINERS

FIELD OF THE INVENTION

The present invention relates to methods of managing a tamper-proof device comprising several software containers. It relates particularly to methods of managing access to the software containers by external entities.

BACKGROUND OF THE INVENTION

A tamper-proof device, also called secure element, is a physical component able to store data and to provide services in a secure manner. In general, a tamper-proof device has a limited amount of memory, a processor with limited capabilities and is devoid of battery. For instance a UICC (Universal Integrated Circuit Card) is a tamper-proof device embedding SIM applications for telecommunication purposes. A tamper-proof device can be installed, fixedly or not, in a terminal, like a mobile phone for example. In some cases, the terminals are constituted by machines that communicate with other machines for M2M (Machine to Machine) applications.

A tamper-proof device can be in the format of a smart card, or may be in any other format such as for example but not limited to a packaged chip as described in PCT/SE2008/050380, or any other format.

It is known to solder or weld the tamper-proof device in a host device, in order to get it dependent of this host device. This is done in M2M (Machine to Machine) applications. The same objective is reached when a chip (a tamper-proof device) containing a Payment application, SIM or USIM applications and associated files is contained in the host device. The chip is for example soldered to the mother-board of the host device or machine and constitutes an embedded UICC (eUICC).

A tamper-proof device like an embedded UICC (eUICC) can contain several telecom profiles (subscriptions) attached to one or several telecom operators. Such tamper-proof devices must comply with GSMA SGP 0.22 RSP Technical Specification standard due to interoperability reasons.

It is also know to use tamper-proof devices complying with GlobalPlatform Card Specification standard. Such tamper-proof devices—including embedded secure element (or eSE)—can contain non-telecom applications like payment applications or access applications.

So far these two kinds of tamper-proof device are implemented through separate physical components. Nowadays, a new need is emerging: embedding both features of a eUICC and of an eSE, in a single tamper-proof device.

The above-cited standards require the profiles and applications to be managed through software containers having the same identifier. Thus when a message come from an external entity, the tamper-proof device is unable to identify the software container really targeted.

There is a need to manage access to several software containers embedded in a single tamper-proof device.

SUMMARY OF THE INVENTION

The invention aims at solving the above mentioned technical problem.

The object of the present invention is a method for managing a tamper-proof device comprising a plurality of software containers and an operating system. The operating system is configured to handle a set of communication protocols with external entities. The operating system accesses a pairing data in which each communication protocol of the set has been associated with a single software container belonging to the plurality of software containers. Upon receipt of a message from one of the external entities, the operating system uses the pairing data to route the message to the software container associated with the communication protocol used to convey the message.

Advantageously, each software container of the plurality of software containers may comprise a file and these files may be targeted by the external entities with a common identifier.

Advantageously, each software container of the plurality of software containers may comprise a root file and these root files may be targeted by the external entities with a common identifier.

Advantageously, the operating system may use the pairing data to route the message only in case the message targets the common identifier.

Advantageously, the plurality of software containers may comprise both a security domain compliant with GlobalPlatform Card Specification standard and a Telecom profile compliant with GSMA SGP 0.22 RSP Technical Specification standard.

Advantageously, the tamper-proof device may be an embedded secure element, an integrated secure element, a secure enclave, a smart card or a Machine-To-Machine device.

Advantageously, the set of communication protocols may comprise T=0 or T=1 as defined by ETSI ISO7816-3 and at least one protocol of the following group: SWP contactless type A, SWP contactless type B, APDU Gate or SPI.

Another object of the invention is a tamper-proof device comprising a plurality of software containers and an operating system. The operating system is able to handle a set of communication protocols with external entities. The operating system comprises a pairing data in which each communication protocol of the set has been associated with a single software container belonging to the plurality of software containers. The operating system comprises a routing agent configured to, upon receipt of a message from one of the external entities, use the pairing data to route the message to the software container associated with the communication protocol used to convey the message.

Advantageously, each software container of the plurality may comprise a file and these files may be targeted by the external entities with a common identifier.

Advantageously, each software container of said plurality may comprise a root file and the root files may be targeted by the external entities with a common identifier.

Advantageously, the routing agent may use the pairing data to route the message to the software container associated with the communication protocol used to convey the message only in case the message targets said common identifier.

Advantageously, the plurality of software containers may comprise both a security domain compliant with GlobalPlatform Card Specification standard and a Telecom profile compliant with GSMA SGP 0.22 RSP Technical Specification standard.

Another object of the invention is a host device which embeds a tamper-proof device according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of tamper-proof devices or secure elements intended to contain several software containers and able to communicate through at least two protocols. The tamper-proof device may be coupled to any type of host machine. For example the host machine may be a mobile phone, a vehicle, a meter, a slot machine, a TV, a tablet, a laptop, a connected watch, or a computer.

The tamper-proof device may be an embedded secure element (eSE), an integrated secure element (iSE), a secure enclave, a smart card or a Machine-To-Machine device. An integrated secure element is a secure element integrated in a hardware element providing additional functionalities distinct from the features of the secure element. For instance a baseband modem may comprise an iSE. More information related to eSE and iSE may be found in Javacard Platform Classic Edition v3.0.5 and Global Platform Card Specifications v2.3.

The external entities which are intended to send messages (commands) to the software containers may be remote servers, a NFC device, the hosting machine itself or any computer machine adapted to initiate the sending of a message targeting one of the software container.

In the present document, "routing a message to a software container" means "routing a message to an entity (like a file or a directory) belonging to the software container". Preferably, the entity is the root file of the software container or the root file of the main security domain of the software container.

Figure 1:
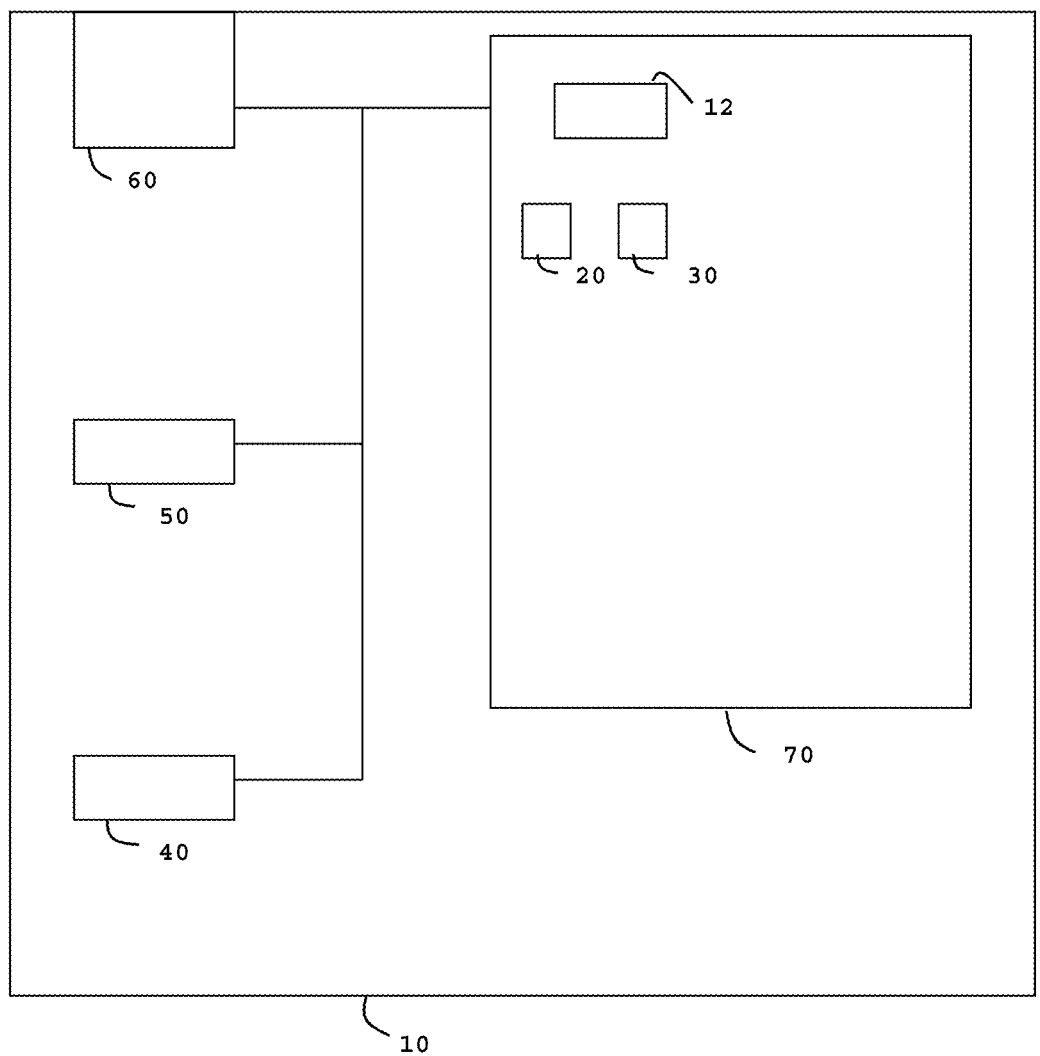
FIG. 1 is an example of hardware architecture of a tamper-proof device according to the invention.

FIG. 1 shows an example of hardware architecture of a tamper-proof device according to the invention.

In this example, the tamper-proof device 10 is a secure element welded to a Telecom terminal (not shown) and acting as a UICC. For instance the tamper-proof device 10 may be a chip embedded in a smart phone. The tamper-proof device 10 comprises a processor 40, a working memory 50, a nonvolatile memory 70 and a communication interface 60.

The working memory 50 may be a RAM and the nonvolatile memory 70 may be a flash memory. The communication interface 60 is designed to convey data according to several communication protocols. For instance, the communication interface 60 may be designed to comply with both ISO7816-3 T=0 protocol and the Serial Peripheral Interface (SPI).

The nonvolatile memory 70 comprises the operating system 12 of the tamper-proof device and two software containers 20 and 30. These software containers are separate and managed by the operating system 12 as isolated entities. In other words, the operating system is able to guarantee that one software container cannot unduly access to data belonging to another software container.

In this example, the operating system 12 is configured to handle both ISO7816-3 T=0 and SWP protocols.

In another example, both the communication interface 60 and the operating system 12 can be configured to handle any combination of at least two protocols among the following: T=1 (or T=0) as defined by ETSI ISO7816-3, SWP contactless type A by ETSI TS 102 613 V.11.0.0-UICC-CLF Interface, SWP contactless type B as defined by ETSI TS 102 613 V.11.0.0-UICC-CLF Interface, SPI and APDU Gate as defined by HCI Extension for the Embedded Secure Element Certification 0.5 and ETSI standard: 102.622 v12.1.0.

The operating system 12 and the communication interface 60 may also be configured to handle a proprietary communication protocol.

Figure 2:
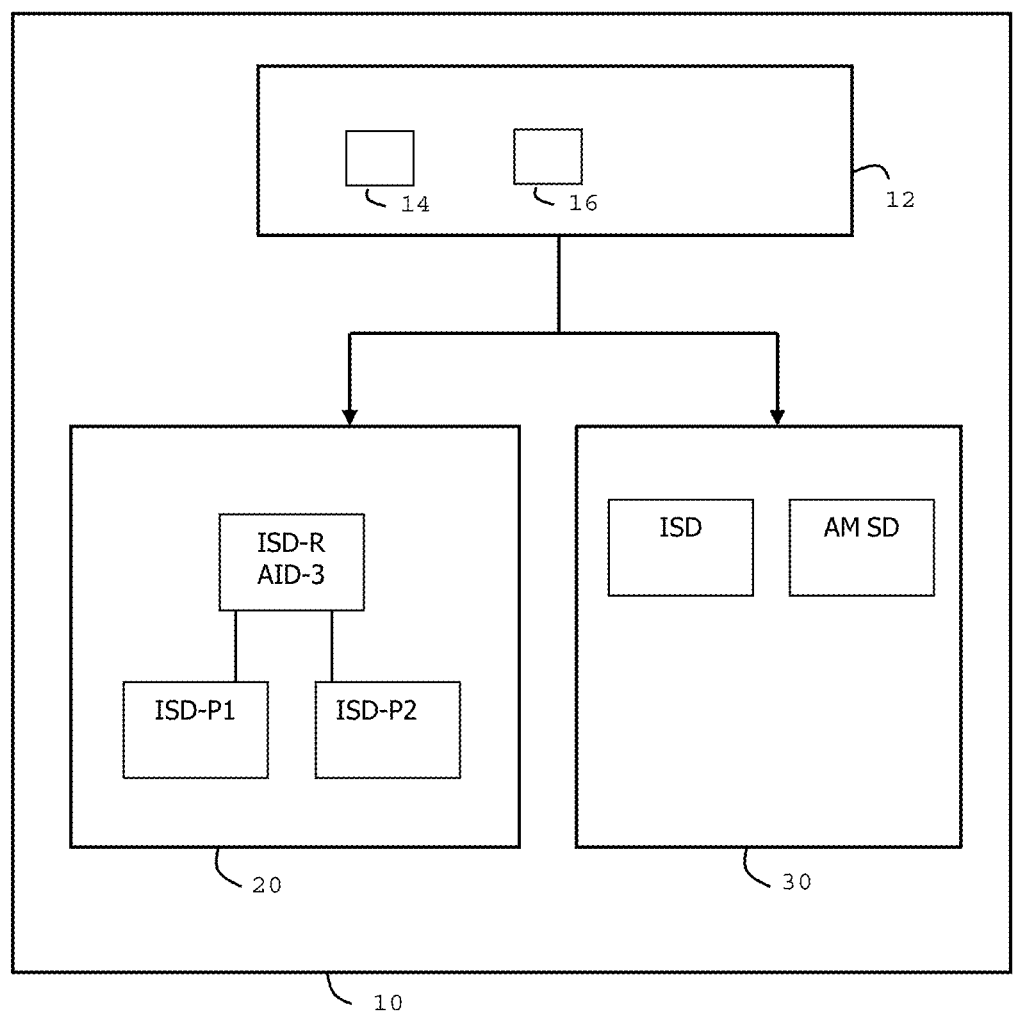
FIG. 2 depicts an example of logical architecture of a tamper-proof device according to the invention.

FIG. 2 shows an example of logical architecture of a tamper-proof device according to the invention.

This figure provides a logical view of the tamper-proof device 10 described at FIG. 1.

The tamper-proof device 10 comprises a software container 30 which stores a profile related to the issuer of the host device hosting the tamper-proof device 10. The structure of this profile is compliant with GlobalPlatform Card Specification V2.3 standard.

More precisely, the software container 30 comprises a main issuer directory named ISD (for Issuer Security Domain. The ISD contains a set of files storing data related to the profile of the host device hosting the tamper-proof device 10. The ISD is implemented as a file having an identifier (named AID) whose value is set to 0xA000000151000000 according to GlobalPlatform Card Specification V2.3 standard.

The software container 30 may contain several applications providing payment, building access or NFC services for example. For instance, the software container 30 of FIG. 2 contains a security domain (AM SD) which includes files and data corresponding to a wallet service.

It is to be noted that the software container 30 does not necessarily contain a profile which is related to the issuer of the host device. It may contain any profile which is related to a non-Telecom actor.

The tamper-proof device 10 comprises a software container 20 which stores data related to Telecom operator subscriptions compliant with GSMA SGP 0.22 RSP Technical Specification V2.1 standard.

More precisely, the software container 20 comprises a root directory named ISD-R (for Root Issuer Security Domain) and two dependent directories containing distinct profiles: ISD-P1 and ISD-P2. ISD-P1 (for Issuer Security Domain of Profile #1) contains a set of files storing data related to a first Mobile Network Operator (MNO) subscription profile. Similarly, ISD-P2 (for Issuer Security Domain of Profile #2) contains a set of files storing data related to a second (MNO) subscription profile.

It is to be noted that the above described directories are implemented as files which have their own identifier (i.e. AID).

According to GSMA SGP 0.22 RSP Technical Specification V2.1 standard, the AID of ISD-R should be managed with the value: 0xA000000151000000. Since another file (i.e. ISD of software container 30) has already been created with the same AID value, the ISD-R is created with a different AID value. For instance 0xA000000152000000 can be allocated to the AID of the ISD-R. The operating system 12 is configured to handle the AID value 0xA000000151000000 as an alias of the ISD-R when the ISD-R is targeted by an incoming command/message. For instance, the operating system 12 can manage a registry allowing to manage the alias mechanism. The alias mechanism defines a link between two identifiers allowing to substitute an AID value for another AID value.

The operating system 12 comprises a pairing data 14 and a routing agent 16. The pairing data 14 comprises a description of an association (a link) between each communication protocol managed by the operating system 12 and one software container stored in the tamper-proof device 10. More precisely, each communication protocol is associated with a single software container. However, one software container can be associated with more than one communication protocol.

Assuming that the operating system 12 is designed to handle communications through ISO7816-3, APDU Gate and SPI protocols, the ISO7816-3 protocol may be allocated to the software container 20 while both APDU Gate and SPI protocols are allocated to the software container 30.

The routing agent 16 is designed to identify the used protocol when an incoming message (or command) is received and to use the identified protocol as a discriminator to direct the message towards its real target. Thus, upon receipt of a message from an external entity, the routing agent 16 uses the pairing data 14 to route the message to the software container associated with the communication protocol used to convey the message.

For instance an incoming command targeting the ISD-R (i.e defining the target thanks to AID=0× A000000151000000) and received through ISO7816-3 protocol is routed to the software container 20 (i.e. to the ISD-R of the software container 20.) as declared in the pairing data 14.

If the operating system 12 includes a Javacard virtual machine, the routing agent 16 may rely on the Javacard getProtocol( ) method (as defined by Javacard 3.x standard for instance) to identify the used protocol in order to distinguish which software container must be targeted.

Preferably, the routing agent 16 is configured to identify the used protocol and to determine the targeted software container with the used protocol only in case the received message contains a targeted AID set to the common value (i.e. 0×A000000151000000 in the above-described example.) In other words, the routing agent 16 can be configured to route an incoming message by using the pairing data 14 only if the targeted root file (i.e. software container) is subject to an alias.

Preferably, the operating system 12 is adapted to manage at least one protocol defined by ETSI ISO7816-3 (e.g. either T=1 or T=0) and at least one protocol among the following list: SWP contactless type A, SWP contactless type B, APDU Gate and SPI. Advantageously, the pairing data 14 contains the following association: all ETSI ISO7816-3 protocol are allocated to the software container 20 while all other protocols are allocated to the software container 30.

In the embodiment of FIG. 2, the routing agent 16 is a software component embedded in the operating system 12. Both the routing agent 16 and the operating system 12 comprises instructions which are executed by the processor of the tamper-proof device 10.

It is to be noted that in the above-described embodiment, versions of the standard are provided as example only. For instance, the tamper-proof device 10 may comprise a software container 20 which stores data related to Telecom operator subscriptions compliant with GSMA SGP 0.22 RSP Technical Specification V2.0 or V2.2 standard.

In one example, the external entity which sends a message (command) to one of the software containers may be an application located in the Rich OS part of a mobile phone. In this case, the message may be conveyed through APDU Gate protocol.

In another example, the external entity which sends a message (command) to one of the software containers may be an application located in the Trusted Execution Environment (TEE) part of a mobile phone. In this case, the message may be conveyed through SPI protocol.

In another example, the external entity which sends a message (command) to one of the software containers may be an application located in an external NFC reader. In this case, the message may be conveyed through SWP protocol via a NFC controller.

It must be understood, within the scope of the invention, that the above-described embodiments are provided as non-limitative examples. In particular, the features described in the presented embodiments and examples may be combined.

The tamper-proof device 10 may comprise more than two software containers whose root files share the same AID value (i.e. common identifier).

The invention allows to route commands targeting files which are not root files.

The architectures of the tamper-proof device shown at FIGS. 1 and 2 are provided as examples only. These architectures may be different.

For example, the pairing data 14 may be stored in the tamper-proof device and outside the operating system 12 itself. In such a case the routing agent 16 is adapted to read the pairing data 14 when needed.

The above described communication interface is a physical interface which may work in either contact mode or in contactless mode.

Although describes in the framework of a telecom equipment, the invention also applies to tamper-proof devices whose software containers do not comprise any Telecom profiles.

The invention claimed is:

1. A method for managing a secure element comprising a plurality of software containers and an operating system, said operating system being configured to handle a set of communication protocols with external entities,
wherein the operating system accesses a pairing data comprising a description of an association between each communication protocol of said set and a software container belonging to the plurality of software containers, each of said communication protocols being associated with a single software container in the secure element, and wherein upon receipt of a message from one of said external entities,
the operating system identifies a particular communication protocol used to convey the message then uses the particular communication protocol identified as a discriminator to route the message to a particular software container, of the plurality of software containers in the secure element, which is declared in the pairing data as being associated with the particular communication protocol, of the set of communication protocols, used to convey the message.

2. The method according to claim 1, wherein each software container of said plurality of software containers in the secure element comprises a file which is targeted by said external entities by means of a same identifier.

3. The method according to claim 1, wherein each software container of said plurality of software containers comprises a root file which is targeted by said external entities by means of a common identifier,
wherein said route targets said root file such that the message is routed to the root file a main security domain of said particular software container in the secure element.

4. The method according to claim 2, wherein the operating system uses the pairing data to route the message only in case the message targets said common identifier.

5. The method according to claim 1, wherein the plurality of software containers comprises both a security domain compliant with GlobalPlatform Card Specification standard and a Telecom profile compliant with GSMA SGP 0.22 RSP Technical Specification standard.

6. The method according to claim 1, wherein the secure element is an embedded secure element, an integrated secure element, a secure enclave, a smart card or a Machine-To-Machine device.

7. The method according to claim 1, wherein the set of communication protocols comprises T=0 or T=1 as defined by ETSI ISO7816-3 and at least one: SWP contactless type A, SWP contactless type B, APDU Gate or SPI.

8. A secure element comprising a hardware processor, a plurality of software containers and an operating system, said operating system being configured to handle a set of communication protocols with external entities,
   wherein the operating system comprises a pairing data comprising a description of an association between each communication protocol of said set and a software container belonging to the plurality of software containers in the secure element, each of said communication protocols being associated with a single software container, and wherein
   the operating system comprises a routing agent configured to, upon receipt of a message from one of said external entities, identify a particular communication protocol used to convey the message, then uses the particular communication protocol identified as a discriminator to route the message to a particular software container, of the plurality of software containers in the secure element, which is declared in the pairing data as being associated with the particular communication protocol, of the set of communication protocols, used to convey the message.

9. The secure element according to claim 8, wherein each software container of said plurality of software containers comprises a file which is targeted by said external entities by means of a same identifier.

10. The secure element according to claim 8, wherein each software container of said plurality of software containers comprises a root file which is targeted by said external entities by means of a common identifier,
   wherein said route targets said root file such that the message is routed to the root file a main security domain of said particular software container managed my the secure element.

11. The secure element according to claim 9, wherein the routing agent is configured to use the pairing data to route the message to the particular software container associated with the particular communication protocol used to convey the message only in case the message targets said common identifier.

12. The secure element according to claim 8, wherein the plurality of software containers comprises both a security domain compliant with GlobalPlatform Card Specification standard and a Telecom profile compliant with GSMA SGP 0.22 RSP Technical Specification standard.

13. The secure element according to claim 8, wherein the secure element is an embedded secure element, an integrated secure element, a secure enclave, a smart card or a Machine-To-Machine device.

14. The secure element according to claim 8, wherein the set of communication protocols comprises T=0 or T=1 as defined by ETSI ISO7816-3 and at least one:
   SWP contactless type A, SWP contactless type B, APDU Gate or SPI.

15. The secure element according to claim 8, wherein the secure element is embedded in a host device.

16. A method for managing a secure element comprising a plurality of software containers and an operating system, said operating system being configured to handle a set of communication protocols with external entities,
   wherein the operating system accesses a pairing data comprising a description of an association between each communication protocol of said set and a software container belonging to the plurality of software containers, each of said communication protocols being associated with a single software container in the secure element, and wherein upon receipt of a message from one of said external entities,
   the operating system identifies a particular communication protocol used to convey the message then uses the particular communication protocol identified as a discriminator to route the message to a particular software container container, of the plurality of software containers in the secure element, which is declared in the pairing data as being associated with a particular communication protocol, of the set of communication protocols, used to convey the message
   wherein each software container of said plurality of software containers comprises a root file which is targeted by said external entities by means of a common identifier,
   wherein said route targets said root file such that the message is routed to the root file a main security domain of said particular software container in the secure element.

* * * * *